3,215,735
METHOD OF TREATING AQUEOUS SOLUTION OF ALKALI SALTS OF AROMATIC CARBOXYLIC ACIDS
Ryoichi Sakurai and Isao Hirose, both of Iwakuni-shi, Yamaguchi-ken, Japan, assignors to Teikoku Jinzo Kenshi Kabushiki Kaisha, Osaka, Japan, a corporation of Japan
Filed July 6, 1961, Ser. No. 122,166
10 Claims. (Cl. 260—525)

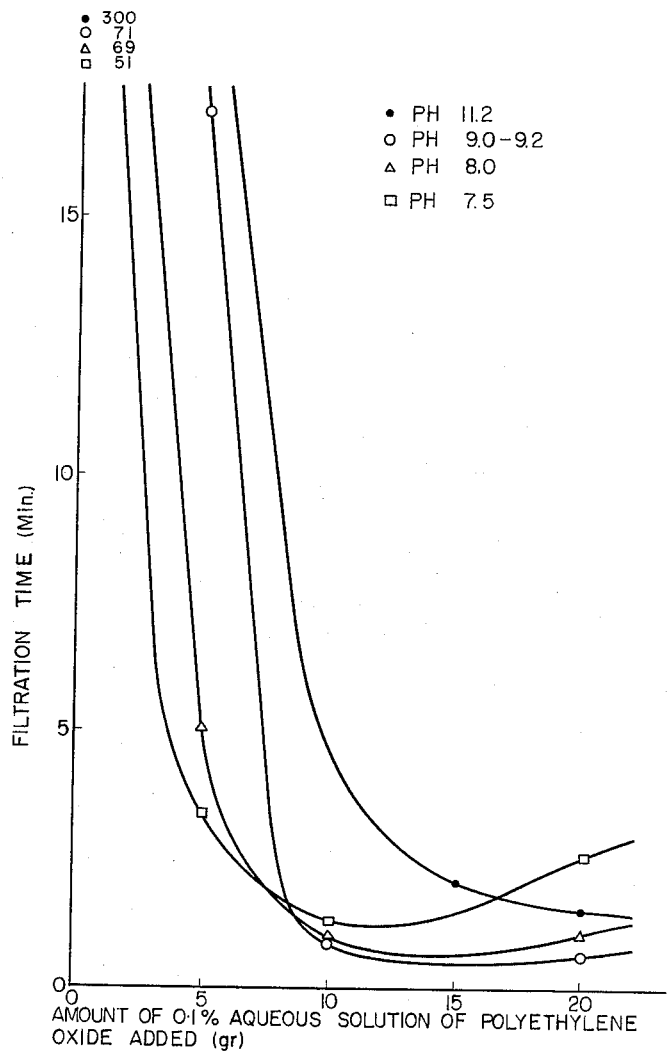

This invention relates to the filtration of alkali salts of aromatic carboxylic acids which are the products of a thermal rearrangement reaction carried out in accordance with the method conventionally known as the Henkel process.

It has been known that the so-called Henkel process, which process comprises adding to an alkali salt of an aromatic carboxylic acid such as benzoic acid, phthalic acid or isophthalic acid, a thermal rearrangement catalyst such as zinc, cadmium and the like and heating the resulting reaction mixture to 300°–500° C. in an inert gas to effect thermal rearrangement of the alkali salt of the starting aromatic carboxylic acid, thereby producing useful terephthalic acid or 1,3,5-benzenetricarboxylic acid, is very advantageous as a method for preparing starting materials utilized in the production of polyester fibers or resins. Hereafter in the specification the above-described technique for preparing terephthalic acid shall be referred to as the Henkel process, and the product of the thermal rearrangement reaction of the Henkel process shall be referred to as a rearrangement product.

This invention relates to a filtration process which comprises dissolving the rearrangement product in water, removing undissolved catalyst and carbonaceous residues by filtration and thereby obtaining an aqueous solution of which main component is the alkali salt of the desired aromatic carboxylic acid.

The object of the present invention is to provide a method for treating an aqueous solution of a rearrangement product wherein the solution is subjected to a filtration to obtain a pure filtrate which contains the desired aromatic carboxylic acid and which is free of colored contaminant, as well as to effect an acceleration of the rate of filtration in the filtration step utilized.

The rearrangement product of the Henkel process, in addition to the alkali salt of the object acid, e.g., terephthalic acid, contains non-terephthalic acid values, i.e., other organic and inorganic impurities such as the thermal rearrangement catalyst employed and carbonaceous residues which are the products of high temperature decomposition. In attempts to recover the object organic acid from the rearrangement product initially containing the impurities, usually the rearrangement product is dissolved in water so that the water-soluble alkali salt of the object organic acid and the water-insoluble metallic catalyst and carbonaceous residues may be separated. The resulting solution is then filtered to remove the insoluble matter, the filtrate if necessary is further purified, and the object free acid is then precipitated from the purified filtrate by the addition of the requisite amounts of a mineral acid, carbon dioxide, or of an aromatic carboxylic acid such as benzoic acid and phthalic acid.

When the object free acid is prepared by the above-described process, it is inevitably necessary to dissolve the rearrangement product in water and filter off therefrom the insoluble catalyst and carbonaceous residues.

The carbonaceous residues present in the rearrangement product, however, are dispersed in very finely divided form in the aqueous solution, and do not settle out even when the dispersions are allowed to stand for relatively long periods. Therefore, it is very difficult to effect the desired separation of the insoluble impurities and purify the solution by a simple filtration technique. Although the exact structures of the finely dispersed impurity material are unknown, the insoluble matter is presumed to be a mixture of substances of high carbon content of various molecular weights, ranging from high to low.

Our research revealed that, upon the solution of the rearrangement product in water, the insoluble impurities in the rearrangement product effects the formation of an aqueous solution of very complex nature containing impurities as dissolved matter and suspended matter, the suspended matter ranging in particle size down through colloidal dimensions to a minimum diameter of a few microns. It was found that the form which a particular impurity assumed depended, inter alia, upon the relative carbonaceous nature thereof and upon the nature and number of any functional groups present therein.

Generally in a dispersed phase, colloidal particles and suspended particles are negatively charged. This is also true with respect to the collidal particles and suspended particles in an aqueous solution of a Henkel rearrangement product, and it is presumed that due to said negative charge the dispersed particles repel each other, rendering the dispersed phase highly stable. It is also known, however, that when an inorganic cation is added to a collodial the charge of the suspended particles in neutralized and the particles coagulate or flocculate. It also is a known fact that the cation of a given group of cations having the same valence which is most effective in flocculating colloidal suspensions is that cation which has the greatest mobility in solution. The expected coagulability of the alkali cations is represented by the following order:

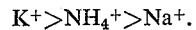
$$K^+ > NH_4^+ > Na^+.$$

The main component of the aqueous solution obtained by dissolving a Henkel reaction rearrangement product in water is an aqueous solution of an alkali aromatic carboxylate, in most cases, the potassium salt, of a considerably high concentration (10–22% by weight). It is indeed surprising that even in the presence of such salts, the carbonaceous residues still are dispersed evenly in the solution without being electrically neutralized and coagulated. Therefore, if it is attempted to filter out these suspended water-insoluble impurities by a simple conventional filtration process, either the filter cloth is plugged up, making the time required for filtration unnecessarily long, or, if a filter aid is used to shorten the filtration time, a relatively large amount of the filter aid is necessary because the particle size of the matter desired to be filtered out is extremely small. Moreover, it is substantially impossible to completely prevent the leakage of the particles in either of the above instances.

When such leakage takes place, the filtrate obtained is impure, and the object organic acid subsequently precipitated therefrom by addition of an acid is markedly colored. Consequently, the commercial value of the resulting product is drastically reduced.

If the filtrate is further purified by such means of a conventional decoloration process such as with active carbon, a relatively large amount of decoloring agent is required. And, from the treated filtrate, a product of relatively low quality still is obtained.

In the Henkel rearrangement reaction, in addition to the carbonaceous residues, alkali carbonate is formed as a by-product. The actual yield of the alkali carbonate by-product depends upon the particular reaction conditions employed, but in all conventional techniques it is not less than 1%. In some embodiments of the Henkel process, in order to impede the formation of alkali carbonate as a by-product, alkali carbonate is added into the rearrangement reaction mixture feed.

Thus a rearrangement reaction product due to the presence of a minor amount of alkali carbonate, forms an aqueous solution having a pH above 11.0.

In the method of the present invention, by initially adjusting the pH of an aqueous solution a Henkel rearrangement reaction product to 5.8–10.0 and thereafter filtering the resulting solution, the purification efficiency is improved and the filtration speed is accelerated. An explanation offered as to the above phenomenon is as follows. Substantially all or at least the greater part of the carbonaceous residues contained in a rearrangement product as the impurities have a negative functional group such as a carboxyl group and hydroxyl group. Consequently, in aqueous solutions of the rearrangement products having a pH of above 11.0, a part of the carbonaceous residual material is in the form of a water-soluble crystalloid and is dissolved, a portion is dispersed in the form of colloidal particles in a partially dissolved state, and the remainder thereof is dispersed in the form of suspended particles. When the pH of this solution is adjusted to below the maximum of about 10.0 in accordance with the present invention, the aforesaid soluble crystalloid and colloidal particles are changed to an insoluble form, and thus the carbonaceous residual material is converted into the form of insoluble suspended particles.

Further, by our experiments it was found that the respective formation ratio of aforesaid crystalloid, colloid and the suspended particles varies by the conditions employed the Henkel process, for example, reaction temperature, reaction time, type of catalyst and pressure of the inert gas such as carbon dioxide. Therefore in accordance with the present invention, in cases wherein a rearrangement product, prepared under reaction conditions which heighten the negative group content of the reaction product, said negative groups being such as carboxyl group and hydroxyl group, is treated, the aqueous solution formed from the rearrangement product is so adjusted to have a pH value approaching a minimum of about 5.8, whereas in cases wherein the negative group content of a rearrangement product being treated is relatively small, the pH need not be so drastically reduced.

The reason for 5.8 being the minimum pH employed in the invention is as follows. The pH of a pure aqueous solution of dipotassium terephthalate is about 8.3–9.6. When the pH of an aqueous solution of a rearrangement product is gradually reduced with an acid to below 8.5, monopotassium terephthalate starts to be formed. The pH of a pure aqueous solution of mono-potassium terephthalate being about 5.0–6.0, until the pH of the rearrangement product solution is reduced to below about 7.0 partially formed monopotassium terephthalate remains dissolved in the water and does not precipitate, and therefore under such conditions the loss of terephthalic acid values from the solution is substantially zero. On the other hand if the pH is reduced to as low as 5.8, the loss of terephthalic acid values still is not conspicuous and also it is possible to recover the small portion of precipitated monopotassium terephthalate. Thus when the ratio of the crystalloid and colloidal particles formed is relatively large, a pH value as low as 5.8 suitably may be employed. However, it is preferred to adjust the pH of said solution to such extent as will convert a maximum of the soluble crystalloid and colloidal particles to suspended particles of the impurity and at the same time will not form monopotassium terephthalate. From that standpoint, the most preferred pH range is 7.0–9.0.

As the chemicals to be used to adjust the pH, any organic or inorganic acid or equal or stronger acidity than carbonic acid, or their acidic salts or neutral salts may be used. An acid at any phase, may be operable, for example as a liquid phase, acetic acid, an aqueous solution of hydrochloric acid; as a solid phase, phthalic acid and terephthalic acid; or as a gaseous phase, carbon dioxide and sulfur dioxide.

If a salt is employed, any weak alkali salt of a strong acid can be used, those preferred being the ammonium salts of hydrochloric, sulfuric and nitric acids. Characteristic of the use of the aforementioned salts is that the pH a rearrangement product solution can be reduced very slowly, and by a proper choice of the type of salt, the desirable pH can be obtained. At this time a solution of a suitable buffering agent can also be used. The use of these salts enables easy adjustment of the pH, as they do not reduce the pH too much even if they are added in a slightly excessive amount with respect to the alkali carbonate content of the solution, unlike the case of adding free acid, and therefore unnecessary loss of terephthalic acid can be avoided. It is also effective suitable to add an aromatic carboxylic acid or its acidic alkali salt in order to adjust the pH of the solution. The pH regulating agent suitably may be added directly to the solid rearrangement product, or suitably may be added to the resulting aqueous solution prepared from the rearrangement product. In embodiments wherein the regulating agent is a salt, the solid rearrangement product may be added to an aqueous solution of said salt so that all the rearrangement product is wetted thereby and the resulting mixture is then heated to above 100° C. but below 550° C. for at least about 30 minutes. By the use of such a treatment in addition to benefits gained by the lowering of the pH of the solution subsequently formed from the heated mixture, a decrease in the colloidal particle-forming portion of the carbonaceous residues is obtained. So heat-treated rearrangement product gives a very pure filtrate when dissolved in water and the carbonaceous residues are separated out by filtration.

We found out that by reducing the pH of an aqueous solution of a rearrangement product having a pH of not less than 11.0 to 5.8 to 10.0, preferably 7.0–9.0 and further adding to the resulting solution a non-ionic, water-soluble organic high molecular weight compound, the filtration speed can be remarkably increased.

As aforesaid in an aqueous solution of a rearrangement product of which the pH has been adjusted to 5.8–10.0, most of the aforesaid soluble crystalloid and colloidal particles have been converted to suspended particles so that the filtering out of the non-terephthalic acid values is easy, the size of said suspended particles being still considerably small. However if a non-ionic, water-soluble organic high molecular weight substance is added thereto, the fine suspended particles flocculate and form flocs of for instance from several to several tens millimeters in diameter, making the filtering out thereof very easy. The coagulability of the flocs being very high, they are durable under mechanical stirring and therefore a subsequent filtration operation carried out thereon is relatively easy.

As the non-ionic, water-soluble organic high molecular weight substance useful in this invention, polyethylene oxide, polyvinyl alcohol, methyl cellulose may be named as some examples. It is sufficient to add 0.001–5.0% by weight of said high molecular weight substance based on the rearrangement product in the aqueous solution. The addition of the high molecular weight substance in a form of an aqueous solution thereof is preferred. The use of said high molecular weight substance in an amount greater than 5.0% by weight based on the rearrangement product is economically expensive and in addition may lower the coagulability of the dispersed particles.

It is advantageous to add a water-soluble porous material in powder form to the aqueous solution of the rearrangement product preliminary to the addition of the high molecular weight substance. For this purpose, any porous water-soluble organic and inorganic substance, such as active carbon, charcoal dust, infusorial earth and Japanese acid clay are suitable. Active carbon and charcoal dust are especially effective in accelerating the filtration speed and lessening the amount of the water-soluble organic high molecular weight substance required to be added. Moreover, such materials advantageously and simultaneously effect decoloration. Thus a very pure filtrate can be obtained. The temperature of the aqueous solution of the rearrangement product at the time of adding the water-soluble, organic high molecular weight substance is preferably not higher than 60° C., because at higher temperatures the resistivity of the formed flocs to mechanical agitation is lowered. However, if proper care is taken, at a temperature higher than 60° C. the desired effect can be sufficiently obtained. Further the addition of a powdered porous material is useful to render the particles dispersed in the aqueous solution easier to be filtered out. It is preferable to add said porous substance in an amount of about 0.5–10 parts by weight based on the amount of rearrangement product in the aqueous solution.

Therefore as a preferred mode of practicing the present invention, a rearrangement product initially is dissolved in water, and the pH of resulting solution is then reduced to 7.0–9.0 to prevent the loss of object organic acid with active carbon being added thereto, if necessary. The pH adjusted solution is then subjected to relatively rapid stirring while an aqueous solution of a water-soluble, organic high molecular weight substance is added thereto. When the latter addition is completed, the speed of stirring is gradually lessened, and the aqueous solution subsequently is filtered to remove essentially all of the non-terephthalic acid values.

When a water-soluble high molecular weight substance is added to the solution of the rearrangement product without any adjustment as to the pH of the solution, it is not only impossible to remove the soluble crystalloid contained in the aqueous solution, but also the additive displays relatively minor coagulating action on the colloidal particles so that a dense floc cannot be formed and therefore the conventional difficulties attendant conventional filtration operations are still present. In accordance with the preferred mode of practicing the invention, if the water-soluble high molecular weight substance is added after the pH of the aqueous solution of the rearrangement product is adjusted to 5.8–10.0, preferably 7.0–9.0, not only the soluble colloidal particles and suspended particles but also the crystalloid can be easily filtered out in the form of a dense floc. Thus it is possible to obtain a very pure filtrate of a thermal rearrangement reaction product of the Henkel process by the treatment of the present invention within a relatively short period.

For effecting the desired separation of the floc, such conventional means as pressure filtration, vacuum-filtration, centrifugal separation and decantation suitably may be employed.

While the above description of the present method has been limited with respect to the treatment of rearrangement reaction products of the Henkel process, it will be understood that the present method is also useful for treating the filtered out catalyst and the carbonaceous residues in subsequent operations. Also it will be apparent that the present method is equally useful in removing the water-insoluble carbonaceous residues from concentrated aqueous solutions of similar high temperature rearrangement reaction products such as reaction products of which the main component is p-oxy benzoate obtained by heating in a carbon dioxide atmosphere potassium salicylate or phenolate to cause the desired thermal rearrangement thereof.

The present invention further will be more clearly understood by reference to the examples hereinbelow, it being understood that the examples are given only for illustrative purposes and not by way of limitation. In the examples parts and percentages expressed are by weight, unless otherwise indicated.

EXAMPLE 1

To 920 parts of dipotassium phthalate, 20 parts of cadmium chloride were added as the catalyst, and the mixture was heated for 2 hours at 400° C. under 5 atmospheres of carbon dioxide pressure in an autoclave. To 900 parts of resulting thermal rearrangement reaction product, 7200 parts of water were then added. The resulting solution was then divided into 9 equal portions, sample numbers of 1 through 9 were given to each of the 9 portions, and sulfuric acid, hydrochloric acid, monopotassium terephthalate, terephthalic acid and ammonium chloride were added variously and separately to the samples in the amounts specified in Table I. Then the samples were boiled, adjusted with respect to pH as shown in Table I, and after the addition to each of 50 parts of infusorial earth as a filter aid, the insoluble matters in the samples were filtered out under a reduced pressure of 400 mm. Hg at 80° C. The length of time required for the filtration of each sample was recorded and is indicated in Table I.

To each of the filtrates obtained from the 9 samples were then added 2 parts of active carbon, and the resulting mixtures were boiled for 30 minutes and filtered at the boiling temperature to reduce the color of the solutions. After the decoloration treatment, terephthalic acid was precipitated from the solutions by the use of 50% aqueous sulfuric acid.

1 gr. portions of terephthalic acid obtained from each of the samples were dissolved in 25 cc. of an ammonia solution consisting of a mixture of conc. aqueous ammonia of specific gravity of 0.88 and water at a volume ratio of 1:1. Then each solution obtained was placed in a quartz cell of 1 cm. cell length and measured with respect to its optical density at 380 m$\mu$ with a spectrophotometer to determine the degree of coloration of the terephthalic acid product. The results are shown in Table I below. Regarding the above measuring method, while the optical density of the terephthalic acid of negligible coloration is less than 0.2, it will be understood that in normal practice terephthalic acid having an optical density of less than 1.0 is satisfactory for use.

The leakage in filtrate was observed with the naked eye, and it was noted that such leakage was appreciably small in all cases except Sample No. 1.

Table I

| Sample No. | Additive | Amount of Additive (part) | pH | Filtration Period (min.) | Degree of Coloration of Terephthalic Acid |
|---|---|---|---|---|---|
| 1 | | | 11.2 | 180 | ∞ |
| 2 | $H_2SO_4$ | 0.5 | 9.0 | 68 | 0.557 |
| 3 | HCl | 1 | 8.8 | 32 | 0.547 |
| 4 | KOOC–C$_6$H$_4$–COOH | 10 | 7.9 | 38 | 0.593 |
| 5 | HOOC–C$_6$H$_4$–COOH | 3 | 8.6 | 79 | 0.698 |
| 6 | $NH_4Cl$ | 1 | 9.2 | 51 | 1.310 |
| 7 | $NH_4Cl$ | 2 | 8.8 | 27 | 0.590 |
| 8 | $NH_4Cl$ | 2.5 | 8.4 | 24 | 0.472 |
| 9 | $NH_4Cl$ | 3 | 8.0 | 24 | 0.445 |

From the foregoing Table I, it will be observed that in present method the period necessary for the filtration is markedly shortened and the degree of coloration of the terephthalic acid product is also reduced as compared to a conventional simple filtration technique (Sample 1) so that the acid product advantageously is adapted for uses wherein purity requirements are important.

*Example 2*

In this example, a rearrangement product obtained under different reaction conditions from those of Example 1 was used.

To 510 parts of dipotassium phthalate, 3 parts of zinc chloride were added as the catalyst, and the mixture was reacted for 2 hours at 420° C. at atmospheric pressure.

500 parts of the resulting thermal rearrangement reaction product were then dissolved into 2000 parts of water, and the resulting solution was divided equally into 5 portions, to which proportions sample numbers of 1 through 5 were given as indicated below in Table II. To each of Sample Nos. 2 through 5, 13 parts of monopotassium terephthalate were added and in addition, ammonium chloride, ammonium sulfate, and ammonium sulfide variously and separately were added in the amount of 3 parts each to the samples indicated in Table II. Samples 2 to 5 then were boiled and adjusted as indicated with respect to pH by the procedure of Example 1. The insoluble matters in each of the five samples were then filtered, employing in each case 25 parts of infusorial earth as a filter aid, under a reduced pressure of 400 mm. Hg at 80° C. The time length required for filtration in each instance was recorded and is shown in Table II. The filtrates obtained were then decolored by adding to each 2 parts of active carbon, boiling the resulting mixture for 30 minutes, and filtering at the boiling temperature. Terephthalic acid was precipitated from the samples by the procedure of Example 1. The degree of coloration of terephthalic acid obtained in each case was measured by the method described in Example 1.

Table II

| Sample No. | Additive | pH | Filtration Period (min.) | Degree of Coloration of Terephthalic Acid |
|---|---|---|---|---|
| 1 | | 11.2 | 120 | 2.35 |
| 2 | | 8.2 | 20 | 0.710 |
| 3 | $NH_4Cl$ | 7.9 | 12 | 0.491 |
| 4 | $NH_4SO_4$ | 8.2 | 13 | 0.531 |
| 5 | $NH_4SO_3$ | 8.2 | 13 | 0.541 |

From Table II it can be observed that, in accordance with the present invention, the time necessary for the filtration is markedly reduced, and the degree of coloration of the terephthalic acid product obtained thereby is also much reduced as compared to conventional filtration procedures utilizing no preliminary pH adjustment.

*Example 3*

The purpose of this example is to illustrate the influences of the addition of an organic high molecular weight substance and/or adjusting of pH upon filtration of an aqueous solution a thermal rearrangement reaction product.

50 gr. of a reaction product obtained by the rearrangement reaction of Example 1 with the exception of utilizing cadmium oxide as the catalyst in the place of cadmium chloride, were placed in an Erlenmayer flask having a capacity of 300 cc., and dissolved in 200 cc. of water. Samples were prepared therefrom and given sample numbers 1 through 24 as indicated in Table III. With the exceptions of Sample Nos. 1, 7, 9, 10, 11, 12 and 24, 10% aqueous hydrochloric acid was added to each sample solution to adjust the pH thereof as indicated in Table III. 20 cc. each of 0.5% aqueous solutions of various organic high molecular weight substances were then added to selective samples, as indicated. All the samples were shaken violently, let stand for 30 minutes, and then filtered. The time length required for filtering the respective aqueous solutions in the amount of 100 cc. under atmospheric pressure at the indicated temperatures were measured and are set forth in Table III. From each of the resulting filtrates terephthalic acid was precipitated by the addition thereto of 50% aqueous sulfuric acid. The degree of coloration of the terephthalic acid was determined by measuring the optical density thereof by the method described in Example 1, except that 0.1 gr. each portions of the terephthalic acid products were used. The results are shown in Table III.

The reason why only 0.1 gr. of terephthalic acid was used to measure the optical density thereof in this example is that, because the decolorization of the filtrates with active carbon having been omitted, the coloration of the product terephthalic acid was remarkable, and with 1 g. each of the test sample the comparison in their coloration degree was impossible.

Table III

| Sample No. | Organic High Molecular Substance | pH | Filtration Temperature (° C.) | Filtration Period | Degree of Coloration of Terephthalic Acid |
|---|---|---|---|---|---|
| 1 | None | 11.3 | 40 | 240 min | ∞ |
| 2 | ----do---- | 9.2 | 40 | 71 min | 1.715 |
| 3 | ----do---- | 8.0 | 40 | 69 min | 1.540 |
| 4 | ----do---- | 7.5 | 40 | 51 min | 0.870 |
| 5 | Polyethylene oxide | 9.0 | 40 | 38 sec | 1.600 |
| 6 | ----do---- | 7.2 | 40 | 1 min. 01 sec | 0.755 |
| 7 | Methyl cellulose | 11.3 | 80 | 10 min. 45 sec | 1.585 |
| 8 | ----do---- | 8.0 | 80 | 11 min. 00 sec | 0.800 |
| 9 | Viscose | 11.3 | 40 | 15 min. 05 sec | 2.540 |
| 10 | Polyvinyl alcohol A | 11.3 | 80 | 1 min. 43 sec | 2.340 |
| 11 | Polyvinyl alcohol B | 11.3 | 80 | 40 sec | 1.530 |
| 12 | Polyvinyl alcohol C | 11.3 | 80 | 5 min. 30 sec | 1.980 |
| 13 | Polyvinyl alcohol A | 8.0 | 80 | 14 min. 21 sec | 1.082 |
| 14 | Polyvinyl alcohol B | 8.0 | 80 | 1 min. 30 sec | 0.853 |
| 15 | Polyvinyl alcohol C | 8.0 | 80 | 4 min. 03 sec | 0.983 |
| 16 | Polymethyl acrylate A | 8.8 | 80 | 52 min | 1.470 |
| 17 | Polymethyl acrylate B | 8.8 | 80 | 51 min | 1.890 |
| 18 | Polysodium acrylate | 8.8 | 80 | 63 min | 1.620 |
| 19 | Carboxymethyl cellulose | 8.8 | 80 | 60 min | 1.820 |
| 20 | Carboxymethyl starch | 8.8 | 80 | 15 min | 1.790 |
| 21 | Sodium alginate | 8.8 | 80 | 48 min | 1.680 |
| 22 | Polyethylene oxide-polyvinyl alcohol mixture 1:1. | 8.8 | 40 | 53 sec | 1.110 |
| 23 | Polyethylene oxide-gluco mannan mixture 1:1. | 8.8 | 40 | 53 sec | 1.020 |
| 24 | Polyethylene oxide | 11.3 | 40 | 35 sec | 1.200 |

Note: With reference to the above table, the polyethylene oxide, viscose, polyvinyl alcohol, and polymethyl acrylate employed are identified hereinbelow.

Polyethylene oxide: That having a molecular weight ranging from 1,000,000 to several times thereof.

Viscose: Aqueous solution of a viscose of which the cellulose content is 0.5%.

Polyvinyl alcohol A: That of which the degree of polymerization is 2,000, 100% saponified.

Polyvinyl alcohol B: That of which the degree of polymerization is 2,000, 79–80% saponified.

Polymethyl acrylate A: That of which the degree of polymerization is 1,000, an ammonium salt, 50% saponified.

Polymethyl acrylate B: That of which the degree of polymerization is 2,500, an ammonium salt, 40% saponified.

From Table III, above, it can be observed that the degree of coloration of terephthalic acid product obtained from an aqueous solution of the rearrangement product which has its pH adjusted to not more than 10 is markedly less than that obtained from a solution unadjusted as to pH, that by adjusting the pH the filtration rate is accelerated by several times over the case wherein the solution is not adjusted as to pH, and that the filtration period is further shortened by the addition of a non-ionic, water-soluble organic high molecular weight substance. It will be further seen that, on the contrary, the addition of an organic substance other than that of a non-ionic nature has very little influence on the filtration rate.

Example 4

The purpose of this example is to illustrate the influences of the addition of a non-ionic, water-soluble organic high molecular weight substance, exemplified by polyethylene oxide, and the adjustment of pH upon the filtration operation of an aqueous solution of a thermal rearrangement reaction product.

To 100 parts of dipotassium phthalate, 5 parts of zinc chloride were added as the catalyst, and the mixture was heated in an autoclave at 450° C. under 15 atmospheres of carbon dioxide pressure for an hour. 200 cc. of water were added to 50 gr. of the resulting reaction product and the mixture was heated to 95° C. for 30 minutes to prepare a solution. Samples of the solution were prepared and given numbers of 1 through 16 as shown in Table IV. With the exceptions of Sample Nos. 1, 14, 15 and 16, 1% aqueous hydrochloric acid was added to each of the samples to adjust the pH thereof as shown in Table IV, and the treated samples were heated for 30 minutes at 95° C. with stirring. Immediately thereafter the heated samples were cooled in a cold water bath to 20° C. Then to some of the samples 0.1% aqueous solution of polyethylene oxide was added in the indicated amount, which addition was followed by stirring for 30 minutes.

All of the samples were then filtered at room temperature under atmospheric pressure. The time length required for filtering out 100 cc. of each sample under said room temperature and atmospheric pressure was measured.

Terephthalic acid was precipitated from each of the filtrates by the addition of 50% aqueous sulfuric acid. The optical density of thus obtained terephthalic acid products was measured by the method described in Example 1. The results of these tests are shown in Table IV below.

Table IV

| Sample No. | 0.1% Aqueous solution of polyethylene oxide (gr.) | pH | Filtration time | Degree of coloration of terephthalic acid |
|---|---|---|---|---|
| 1 | 0 | 11.2 | 300 min | ∞ |
| 2 | 0 | 9.2 | 71 min | 1.715 |
| 3 | 5 | 9.0 | 17 min | 1.620 |
| 4 | 10 | 9.0 | 49 sec | 1.740 |
| 5 | 20 | 9.0 | 38 sec | 1.600 |
| 6 | 0 | 8.0 | 69 min | 1.540 |
| 7 | 5 | 8.0 | 5 min. 03 sec | 1.520 |
| 8 | 10 | 8.0 | 50 sec | 1.605 |
| 9 | 20 | 8.0 | 1 min. 01 sec | 1.460 |
| 10 | 0 | 7.5 | 51 min | 0.755 |
| 11 | 5 | 7.5 | 3 min. 25 sec | 0.870 |
| 12 | 10 | 7.5 | 1 min. 15 sec | 0.800 |
| 13 | 20 | 7.5 | 2 min. 37 sec | 0.830 |
| 14 | 10 | 11.2 | 7 min | 1.820 |
| 15 | 15 | 11.2 | 2 min. 05 sec | 1.830 |
| 16 | 20 | 11.2 | 1 min. 30 sec | 1.820 |

The attached drawing shows diagrammatically the relationship among the amount of polyethylene oxide added, pH and the filtration period as set forth in Table IV above. From both Table IV and the drawing it can be seen that concomitant with the lowering of the pH, the optimum amount of polyethylene oxide added is markedly decreased, and also the degree of coloration of the terephthalic acid product is conspicuously improved.

From the standpoint of filtration rate, it can be readily observed that in the cases when the solution of the rearrangement product initially is adjusted as to its pH and an aqueous solution of polyethylene oxide subsequently is added, the filtration rate is greatly improved as compared to the case wherein an aqueous solution of polyethylene oxide is added to a solution not preliminarily adjusted as to pH. Also in the latter case the improvement in degree of coloration of the product is less noticeable.

Thus having set forth the invention, what we claim is:

1. A method for treating a rearrangement product, said rearrangement product being prepared by heating an alkali salt of an aromatic carboxylic acid at a temperature above about 300° C. in an inert gaseous atmosphere and in the presence of a thermal rearrangement catalyst to provide a solid thermal rearrangement product containing terephthalic acid in the form of dialkali terephthalate and non-terephthalic acid as impurities and said rearrangement product being characterized by forming an aqueous solution having a pH of at least about 11, which comprises dissolving said rearrangement product in water, adjusting the pH of the resulting rearrangement product aqueous solution to a value in the range of from about 5.8 to about 10.0 by the addition to said aqueous solution of a pH regulating agent selected from the group consisting of organic and inorganic acids, and the acidic and neutral salts of said acids, the aqueous solutions of which are at least as strongly acidic as carbonic acid of corresponding concentrations, to provide an aqueous solution in which essentially all of the terephthalic acid initially present in said rearrangement product is in soluble form, and in which essentially all non-terephthalic acid present is in an insoluble filterable form, and separating said insoluble non-terephthalic acid impurities from said aqueous solution.

2. The method according to claim 1 wherein said alkali salt of said aromatic carboxylic acid is selected from the group consisting of dialkali phthalate, dialkali isophthalate, and alkali benzoate.

3. The method according to claim 1 wherein said pH adjustment of said rearrangement product aqueous solution is to a value in the range of from about 7.0 to about 9.0.

4. The method according to claim 1 wherein, subsequent to said pH adjustment and preliminary to said separation step, from about 0.001 to about 5.0% by weight of said rearrangement product of a non-ionic, water-soluble organic substance selected from the group consisting of polyethylene oxide, polyvinyl alcohol, methyl cellulose, and mixtures thereof, is added to said aqueous solution.

5. The method according to claim 4 wherein the temperature of said rearrangement product aqueous solution is below about 60° C. at the time of said addition of said non-ionic organic substance.

6. The method according to claim 1 wherein, preliminary to said separation step, a porous, water-insoluble, filter aid powder is added to said rearrangement product aqueous solution.

7. A method for treating a rearrangement product, said rearrangement product being prepared by heating an alkali salt of an aromatic carboxylic acid selected from the group consisting of dialkali phthalate, dialkali isophthalate, and alkali benzoate at a temperature above about 300° C. in an inert gaseous atmosphere and in the presence of a thermal rearrangement catalyst to provide a solid thermal rearrangement product containing terephthalic acid in the form of dialkali terephthalate and non-terephthalic acid as impurities and said rearrangement product being characterized by forming an aqueous solution having a pH of at least about 11, which comprises dissolving said rearrangement product in water, adjusting the pH of the resulting rearrangement product aqueous solution to a value in the range of from about 5.8 to about 10.0 by the addition to said aqueous solution of a pH regulating agent selected from the group consisting of organic and inorganic acids, and the acidic and neutral salts of said acids, the aqueous solutions of which are at least as strongly acidic as carbonic acid of corresponding concentrations, to provide an aqueous solution in which essentially all of the terephthalic acid initially present in said rearrangement product is in soluble form, and in which essentially all non-terephthalic acid present is in an insoluble filterable form, thereafter adding to the resulting aqueous solution from about 0.001 to about 5.0% by weight of said rearrangement product of a non-ionic, water-soluble organic substance selected from the group consisting of polyethylene oxide, polyvinyl alcohol, methyl cellulose, and mixtures thereof, and separating said insoluble non-terephthalic acid impurities from said aqueous solution.

8. The method according to claim 7 wherein said pH adjustment of said rearrangement product aqueous solution is to a value in the range of from about 7.0 to about 9.0.

9. The method according to claim 7, wherein the temperature of said rearrangement product aqueous solution is below about 60° C. at the time of said addition of said non-ionic organic substance.

10. The method according to claim 1 wherein, preliminary to said separation step, a porous, water-insoluble, filter aid powder is added to said aqueous solution.

References Cited by the Examiner

UNITED STATES PATENTS

| | | | |
|---|---|---|---|
| 2,343,434 | 3/44 | Wells et al. | 260—2 X |
| 2,841,615 | 7/58 | Schutt et al. | 260—525 |
| 2,846,468 | 8/58 | York | 260—525 |
| 2,863,913 | 12/58 | Raecke | 260—525 X |
| 2,866,761 | 12/58 | Hill et al. | 260—2 X |
| 2,866,815 | 12/58 | Shirp | 260—525 X |
| 2,879,291 | 3/59 | Elliott | 260—515 X |
| 2,905,709 | 9/59 | Shenk et al. | 260—515 |
| 2,927,130 | 3/60 | Schutt | 260—525 X |
| 2,938,050 | 5/60 | Shirp et al. | 260—525 X |
| 3,020,230 | 2/62 | Smith | 260—2 X |

OTHER REFERENCES

Bailey et al.: Ind. and Eng. Chem. 50, No. 1, pp. 8–11, (1958).

Noble: Latex in Industry, pages 132–6, (1953—2nd Ed.).

Schildknecht: Vinyl and Related Polymers, pp. 353–4 (1951).

Weissberger: Separation and Purification, vol. III, Part I, pages 727–9 (1956—2nd Ed.)

Weissberger (II): Technique of Organic Chem., vol. III, Part I, pages 467–9 (1956).

LORRAINE A. WEINBERGER, *Primary Examiner.*

CHARLES B. PARKER, LEON ZITVER, *Examiners.*